G. R. DE LONG.
NUT.
APPLICATION FILED JUNE 26, 1920.

1,375,782.

Patented Apr. 26, 1921.

Inventor:
George R. De Long,
By Chas. N. Butler
Attorney

UNITED STATES PATENT OFFICE.

GEORGE R. DE LONG, OF HARRIMAN, PENNSYLVANIA.

NUT.

1,375,782.      Specification of Letters Patent.     Patented Apr. 26, 1921.

Application filed June 26, 1920. Serial No. 391,922.

*To all whom it may concern:*

Be it known that I, GEORGE R. DE LONG, a citizen of the United States, residing at Harriman, in the county of Bucks and State of Pennsylvania, have invented certain Improvements in Nuts, of which the following is a specification.

This invention is a peculiar nut especially adapted for quick as well as secure engagement with and release from a coacting bolt.

In assembling structural work, as in ship and building construction, the parts must be drawn and held firmly together for the purpose of and during riveting, and in the use of bolts of ordinary character a great deal of time is consumed in drawing up and detaching the nuts.

The present invention provides for effecting the desiderata of greatly reducing the time required for bolting up structures and for removing the bolts, while effecting an efficient temporary connection adapted for drawing and firmly holding the parts together.

The invention is characterized, in its preferred form, by providing a nut with a thread or spiral of one or more convolutions together with thread or spiral sections in continuation thereof, the sections being formed in the bottom of a channel or opening adapted for the entrance and engagement of a threaded end of the bolt by a transverse movement, the final engagement being effected by turning the nut upon the bolt to engage the full thread convolution therewith.

The invention is embodied in the construction set out in the following description and the accompanying drawings in illustration thereof.

Figure 1:
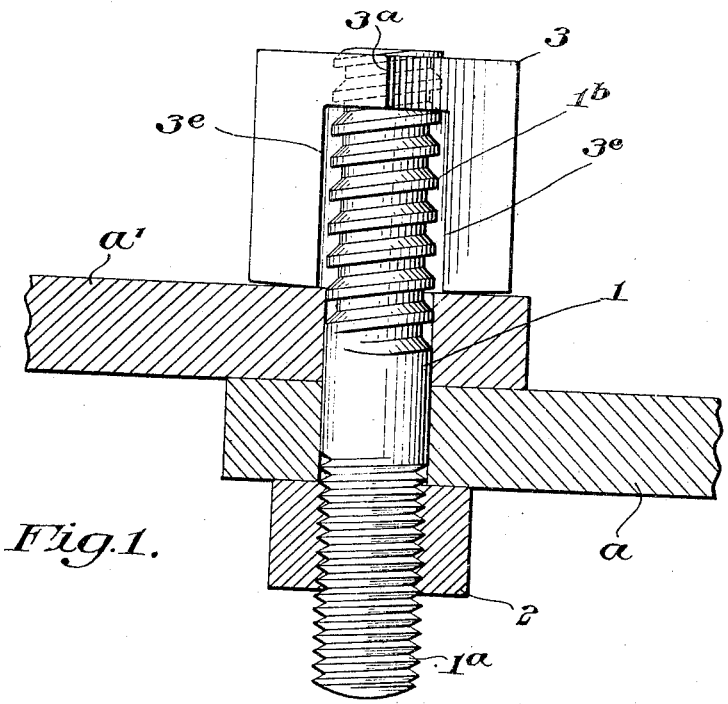
Figures 2, 3:
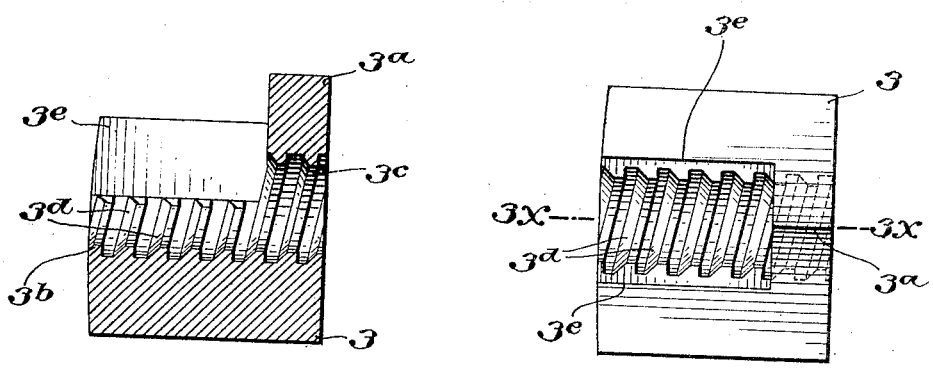
Figure 4:
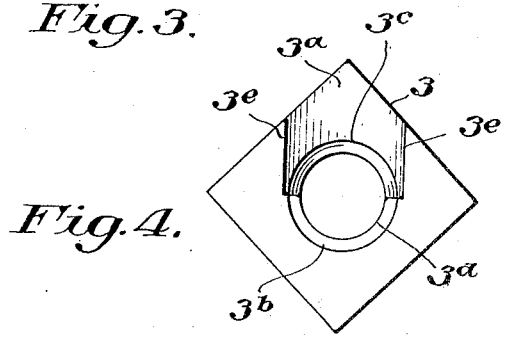

In the accompanying drawings, Figure 1 is a plan view of a bolt provided with a mutilated nut made in accordance with my invention, shown in use for clamping plates together, the plates and a usual nut on the bolt being shown in section; Fig. 2 is a plan view of the detached mutilated nut shown in Fig. 1; Fig. 3 is a sectional view taken on the line $3^x$—$3^x$ of Fig 2; and Fig. 4 is an end view of the mutilated nut.

In the application of the invention illustrated in the drawings, a bolt 1 has on its opposite ends the usual V-thread $1^a$ and the ratchet or square faced thread $1^b$, the bolt extending through the plates $a$ and $a'$ which are to be clamped together thereby. A nut 2 is engaged on the thread $1^a$ and engages the plate $a$ and a nut 3 is engaged on the thread $1^b$ in engagement with the plate $a'$, the nuts coacting with the bolt to clamp the plates firmly together.

The nut 3 has a full transverse section $3^a$ for a relatively small fraction of its length and a mutilated section $3^b$ for the remainder of its length, the full section or part of the nut containing the full convolution thread $3^c$, and the remainder or mutilated part has the thread sections $3^d$ (each approximately one-half of a complete convolution) together with the faces or surfaces $3^e$ approximately tangent thereto. The surfaces $3^e$ form the sides of a channel and are spaced to permit them to be passed on opposite sides of the bolt 1 so as to engage the thread $1^b$ with the thread sections $3^d$ and permit the nut 3 to be fully engaged with the bolt or to have its convolution $3^c$ engaged therewith by a turn or two.

In operation, with the plates $a$ and $a'$ in place and the nut 2 properly positioned on the thread $1^a$, the bolt 1 is inserted through the plates and the nut 3 is engaged therewith by a lateral movement so that the sides $3^e$ of the mutilated section $3^b$ pass on opposite sides of the thread $1^b$ which is caused to interlock with the thread sections $3^d$. A turn or two of the nut 3 now engages the thread $1^b$ with the full thread $3^c$, which prevents the nut from displacement on or dropping from the bolt, while engaging it with the plate $a'$ simply and quickly. The nut 2 is now turned up through the short distance required for effecting "tight iron" or a close engagement between the plates $a$ and $a'$, thus saving much of the time usually required for traversing the nut on the bolt to effect the desired engagement.

It will be understood that the square engagement between the thread $1^b$ and the threads $3^c$ and $3^d$ is not essential to the operation, since threads of various forms may be used, but this thread provides a strong and firm connection between the bolt and the mutilated nut which prevents any tendency that certain forms of threads, with too greatly inclined faces, may have to separate by a wedging action when great force is applied.

The nut 3 is preferably made with a substantially longer engagement than the nut 2, with the bolt 1, to compensate for the use of the thread sections 3ᵈ instead of a full thread of continuous convolution, and the depth of the channel having the sides 3ᵉ is made greater preferably than the thickness of the bolt to provide a bearing or bearings by the nut against the adjacent plate on the opposite side of such bolt from the thread sections 3ᵈ.

The bolt is adapted to be disengaged by turning back the nut 3 through the length of its full engagement therewith, by a turn or two, when it can be disengaged instantly by moving it laterally, thus saving the time commonly required for turning back a nut throughout the length of its thread.

Having described my invention, I claim:

1. The combination with a bolt having a thread, of a nut provided with a thread having one or more complete convolutions and a recess provided with thread sections, said recess having sides adapted to be passed on opposite sides of said bolt to engage a thread thereof first with said thread sections and then with a complete convolution aforesaid.

2. The combination with a bolt having two threads, one of which has an approximately square face, of a nut having a recess provided with a corresponding square faced thread and sides between which said bolt is adapted to be passed to engage said square faced threads and a nut adapted for engaging the other of said threads.

3. The combination with a bolt having an approximately square faced thread, of a nut provided with a coacting thread having one or more complete convolutions and a recess provided with coacting thread sections, said recess having sides adapted to be passed on opposite sides of said bolt to engage said thread thereof with said thread sections and then with a complete convolution aforesaid.

4. The combination with a bolt having a thread, of a mutilated nut provided with a thread having one or more complete convolutions and a threaded section adapted to be engaged by the thread of said bolt by moving either said nut or bolt transversely to the other.

5. A mutilated nut having a full section with an opening therethrough and a recessed section having a threaded channel therein alined with said opening.

6. A mutilated nut having a part containing a thread extending through substantially more than a half convolution and a laterally open part containing thread sections extending through not substantially more than a half convolution.

In testimony whereof I have hereunto set my name this 25th day of June, 1920.

GEO. R. DE LONG.